Figure 1:
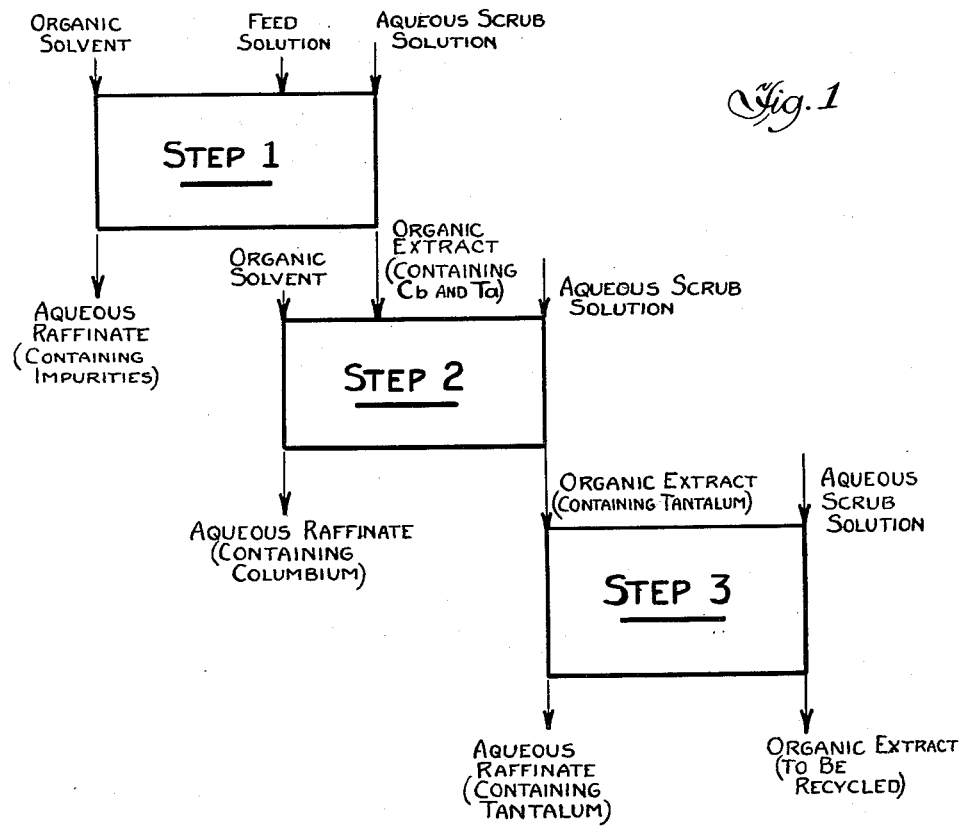

Inventor,
James A. Pierret,
By Schneider, Dressler
Goldsmith & Clement,
Attys.

United States Patent Office 3,117,833
Patented Jan. 14, 1964

3,117,833
PROCESS OF PURIFYING AND SEPARATING COLUMBIUM AND TANTALUM VALUES FROM EACH OTHER
James A. Pierret, Round Lake, Ill., assignor to Fansteel Metallurgical Corporation, a corporation of Illinois
Filed Sept. 25, 1958, Ser. No. 763,373
13 Claims. (Cl. 23—19)

This invention relates to a new method for the production of separate solutions of columbium and tantalum values, both having high purity, from sources such as columbite-tantalite ores, microlite ores, and the like.

SUMMARY OF INVENTION

In the method of the present invention, purification of the columbium and tantalum values and the subsequent separation of solutions containing these values are accomplished in three steps, each involving a continuous multistage countercurrent liquid-liquid extraction system. In a modification of the method, a fourth or supplemental step is also employed.

A mixer-settler unit may suitably be used for each step. The quantity of water present and the acidity of the scrub solution is controlled in successive steps to change the relative solubility of the columbium and tantalum values and certain impurities in the two liquids of the liquid-liquid system, in order to produce the desired separation of (1) impurities, (2) columbium, and (3) tantalum, in that order.

The first two of the three steps of the basic method of this invention employ the double solvent technique of extraction, which calls for the introduction of the feed solution for each extraction step at an intermediate stage in the continuous countercurrent extraction system of that step. One of the pair of solvents in each of these two steps is a water-immiscible organic solvent; the other is an aqueous solvent such as an aqueous solution of an acid.

In the first step, the columbium and tantalum values are purified by separating them from metal impurities—such as titanium, iron, silicon, aluminum, etc.—originally present in the columbite-tantalite, microlite, or other ore. In this step the feed solution is a highly concentrated solution of fluocolumbic acid, fluotantalic acid, and fluorides and/or fluo-acids of metal impurities originally contained in the columbite-tantalite ore. The highly concentrated feed solution may be an aqueous solution or it may be a solution in an organic solvent selected from the group consisting of methyl isobutyl ketone, diethyl ketone, cyclohexone, diisobutyl ketone, tributyl phosphate, and mutually soluble mixtures thereof.

In the second step of the method the columbium value leaves the liquid-liquid extraction system in the aqueous raffinate, and the third step produces an aqueous solution of the tantalum value. In the second and third steps, respectively, the normality of the feed solution, as compared to the feed solution of the first step, is progressively lower.

ADVANTAGES OF THE INVENTION

Columbite-tantalite ores present a serious processing problem in the separation and purification of their major constituents, columbium and tantalum. This problem is presented because columbium and tantalum, co-existing in nature in such ores, have a very similar chemistry. The problem also exists in the recovery of columbium and tantalum from other sources such as microlite ores.

The present commercial method of separation and purification of these two elements from columbite-tantalite ores is by the Marignac process. This process includes a plurality of crystallizations from columbium-tantalum fluoride solutions. Each of these crystallizations is slow, and there are many other disadvantages of the Marignac crystallization process compared to the method of this invention.

The highly concentrated solutions used in the present invention involve less labor, shorter process times, and less equipment than the Marignac crystallization process. No heating or cooling of solutions is required in the method of this invention, and it is thus independent of atmospheric conditions. High purity products and high efficiency of product recovery from the starting material are assured because of favorable separation factors, smaller volume of solutions, and the use of a continuous process instead of batch techniques.

The present invention also has important advantages over the known liquid-liquid methods of separation and purification of columbium and tantalum. Known liquid-liquid methods involve only two extraction steps in all, and neither of them is necessarily a double solvent extraction.

In the first step of the known methods, a ketone or other organic solvent immiscible in water is used to wash a relatively dilute acidic solution of fluorides of tantalum and columbium. The mixture of this aqueous acid solution and any aqueous scrub solution that may be used is of low enough normality and contains sufficient water to maintain substantially all the columbium present as a water soluble fluorine compound (such as columbium oxyfluoride) which is not extracted to the organic phase.

In this first step of the known liquid-liquid methods the acidity is maintained high enough to keep the fluotantalic acid preferentially soluble in the ketone, so that it is extracted to the organic phase while the fluocolumbic acid goes to the aqueous acid phase. In the second step of the known methods, which is similar to the third step of the method of the present invention, a scrub solution of dilute acid renders the fluotantalic acid preferentially water soluble and causes it to be extracted to the aqueous phase.

The end products obtained with known liquid-liquid methods are thus separate aqueous solutions of a fluorine compound of columbium and fluotantalic acid, respectively. However, these solutions are very different from the final solutions produced by the method of the present invention. The two solutions resulting from the known methods both contain, in addition to the desired metals columbium and tantalum, a number of impurities such as iron and titanium which are extremely difficult if not impossible to remove after the acidity of the solution has been reduced to the point at which the first step of the known methods is carried out. This is especially true of the impurities in the columbium solution.

In contrast, the separate solutions of the fluorine compound of columbium and of flotantalic acid which are obtained from the second and third steps of the method of the present invention are substantially free of impurities. Impurities such as iron, titanium, tin, zirconium, silicon, aluminum and the like do not form a fluoride or fluo-acid which is as soluble in ketone as are fluocolumbic and fluo-tantalic acids under the conditions of the first step of the instant invention. These impurities are thus extracted to the aqueous phase of the first step, while there is as yet insufficient water present to convert the fluocolumbic acid to the water soluble fluorine compound.

In essence, the purification step in the present method can be said to precede—contrary to the order of these steps in the known methods of processing these elements—the separation of the columbium and tantalum values. As a result, the removal of impurities is carried out very much more thoroughly and easily with the method of this invention than has been possible with prior methods.

REACTION CONDITIONS IN PURIFICATION STEP IN METHOD OF INVENTION WITH AQUEOUS STARTING MATERIAL

Methyl isobutyl ketone may be the water-immiscible organic scrub solvent introduced at one end of the countercurrent liquid-liquid extraction system of the first step of this method. Other organic solvents which may be used are diethyl ketone, cyclohexone, diisobutyl ketone, and tributyl phosphate.

The aqueous scrub solution may be water or an aqueous solution, preferably highly concentrated, of a mineral acid selected from the group consisting of sulfuric acid, nitric acid, hydrofluoric acid, hydrochloric acid, perchloric acid, phosphoric acid and compatible mixtures of said acids.

The organic scrub solvent and the aqueous scrub solution are introduced at opposite ends of the continuous countercurrent system, while the feed solution is introduced at an intermediate stage.

When the feed solution is an aqueous solution of fluocolumbic and fluotantalic acids, the concentration of these acids should preferably be of the order of about 600 to 900 grams combined oxides per liter.

In the first step of the method of this invention the metal impurities originally contained in the columbite-tantalite ore, or other ore such as microlite, are removed from the columbium and tantalum values by reason of the fact that the solubility of the fluorides and/or fluo-acids of these metal impurities in the substantially water- immiscible organic solvent such as methyl isobutyl ketone is less than that of the fluocolumbic and fluotantalic acids.

This difference in solubility is particularly marked at low water concentrations. Thus, in order for the countercurrent liquid-liquid extraction of the first step to be effective within a feasible number of stages, the feed solution for the first step of the method of this invention must be highly concentrated.

The preferred aqueous feed solution is one in which the columbium, tantalum, and metal impurities of the starting material have been dissolved in stoichiometric amounts of hydrofluoric acid to yield a solution having a normality of at least about 26 N measured in terms of hydrofluoric acid, or the "equivalent normality" of hydrofluoric and other acids. If the equivalent normality of the solution is lowered, as by the addition of water, to a normality of not less than about 20 N, quite good results will still be achieved. Adequate results are obtained if the equivalent normality is above about 13 N. Below about 13 N, extraction of the columbium becomes so inefficient as to require an impracticable number of stages in the liquid-liquid system.

It has been found that there should be an excess of organic scrub solvent over the aqueous feed solution to achieve most efficient removal of the columbium and tantalum from the feed solution. For best results, it has been found that the rate of flow (volume passing through the extraction system in a given time) of the organic solvent when methyl isobutyl ketone is the solvent used as a scrub should be about 10 units, if the rate of flow of the aqueous feed solution is about 5 units.

As the metal impurities in the starting material are commonly only a small percentage by weight of the whole material, it is obvious to one skilled in the art that the flow rate of the aqueous scrub solution (to which the impurities are to be back-extracted) need be only a fraction of the flow rate of the feed solution. As a matter of fact, remembering that the differential solubility between the impurities on the one hand and the columbium and tantalum on the other is greatest at low water concentration, it will also be plain to one skilled in the art that it is preferable for the scrub solution flow rate to be kept low in order to avoid hydrolysis and a reduction in the acidity of the feed solution any more than is necessary. With the indicated flow rates of 10 units of methyl isobutyl ketone as organic scrub solvent and 5 units of aqueous feed solution, a flow rate of one unit of aqueous scrub solution has been found to produce very good results.

It is desired that the aqueous scrub solution not reduce the acidity of the feed solution much below the preferred equivalent normality stated above after being mixed with the feed solution. For this reason, it has been found to be desirable to maintain the concentration of the aqueous scrub solution at about 12N with the flow rates just stated. However, as is apparent to one skilled in the art, the acidity of the aqueous scrub solution may be considerably reduced if the flow rate of the solution is reduced, or the number of stages in which the organic solvent washes the feed solution is increased, or both. The normality of the aqueous scrub solution in this step may suitably be from about 10 to about 18.

REACTION CONDITIONS WITH ORGANIC STARTING MATERIAL

When the feed solution comprises fluocolumbic and fluotantalic acids dissolved in an organic solvent, the organic solvent and the aqueous scrub solution introduced at opposite ends of the continuous countercurrent system in the first step of the method of this invention may be the same as those mentioned above for an aqueous feed solution.

The organic starting material may be prepared by dissolving pulverized ore in stoichemetric amounts (or slightly more) of a 70% aqueous solution of hydrofluoric acid, and intimately contacting the resulting slurry with an organic solvent selected from the group consisting of methyl isobutyl ketone, diethyl ketone, cyclohexone, diisobutyl ketone, tributyl phosphate and mutually soluble mixtures thereof.

When the organic solvent employed is methyl isobutyl ketone, the method of preparation just described results in an organic starting material containing fluocolumbic and fluotantalic acids in concentrations of the order of about 200 to 400 grams combined oxide per liter of solution. The "equivalent normality" of hydrofluoric and other acids in this starting material should fall in the range of about 8 to 13 N, which represents very nearly the maximum concentration capacity of methyl isobutyl ketone for fluocolumbic and fluotantalic acids.

In this form of the method, the feed solution itself supplies the major portion of the organic solvent that is later to be passed out of the system in the organic extract. Thus, it has been found that with a rate of flow of organic feed solution of about 5 units, a rate of flow of only about 1 unit for methyl isobutyl ketone as the organic scrub solvent produces good results.

A suitable rate of flow of the aqueous scrub solution with a feed solution rate of flow of 5 units is about 1 unit. This in effect makes the above mentioned rate of countercurrent flow of 1 unit for the organic scrub practically a minimum figure for the organic scrub if it is desired to insure that small quantities of columbium and tantalum are not back-extracted with the impurities in the aqueous raffinate. If back-extraction of a small quantity of columbium or tantalum can be tolerated, the flow rate of the organic scrub solvent may be lowered as desired.

The acidity of the aqueous scrub solution is suitably the same with use of an organic feed solution as with use of an aqueous feed solution.

REMOVAL OF IMPURITIES IN FIRST STEP

As a result of the differential solubilities of the various compounds present, substantially all the columbium and tantalum values contained in either an aqueous or an organic feed solution pass out of the continuous countercurrent liquid-liquid extraction system of the first step in the organic solvent phase of the system. At the same time, substantially all the impurities present, such as the fluorides of titanium, iron, silicon, aluminum, etc., pass into the raffinate or aqueous phase, which is then discarded. The net effect of this is to achieve purification of the columbium and tantalum values before any effort is made to separate the two values from each other.

In addition to the metal impurities just named, other common impurities that can be removed by the method of this invention include zirconium, tin, manganese, calcium, sodium, tungsten and molybdenum. Still other impurities that are sometimes present in columbite-tantalite or similar ores and can be removed by the present method are potassium, magnesium, barium and strontium. The instant method is useful for removing any metal whose fluorides and/or fluo-acids are less soluble in a substantially water-immiscible organic solvent selected from the group listed above, or any mutually soluble mixtures of such solvents, than are fluo-columbic and fluotantalic acids.

It is desirable that the mineral acid employed in this first step be one that will not form with the impurities present in the starting mixture, such as titanium, iron, aluminum, tin, etc., any compound soluble in the organic solvent employed. For example, if iron is present in the feed solution for the first step, hydrochloric acid should not be used as the mineral acid in the scrub solution unless it is of no concern that iron may pass into the organic phase in this step, and along with the columbium into the aqueous raffinate in the second step.

SEPARATION OF COLUMBIUM VALUE

Decreasing the acidity, i.e., increasing the pH, of a solution of fluocolumbic and fluotantalic acids by a certain amount converts the fluocolumbic acid into a fluorine compound of columbium that is preferentially soluble in water. Decreasing the acidity still further renders the fluotantalic acid preferentially soluble in water.

In the second step of the method of this invention, the organic solution of fluocolumbic acid and fluotantalic acid derived from the first extraction is introduced at an intermediate stage in a second continuous countercurrent liquid-liquid extraction system.

In this step, the same organic solvent as was used in the first step, or one mutually soluble with the first organic solvent, is introduced at one end of the multi-stage countercurrent extraction system. The scrub solution introduced at the other end of the system may be water or an aqueous solution, preferably dilute, of the same mineral acid as was employed in the first step or another acid from the group of mineral acids specified above.

The organic solvents and any mineral acids employed in the extraction systems of the first two steps of this method must all be compatible. By the term "compatible" is meant that the organic solvents and mineral acids may be intimately intermixed without substantial degradation of either component, and without any substantial chemical combination between them.

During this second step, the acidity of the mixture in the extraction system is made low enough that the major part, or substantially all, if desired, of the fluocolumbic acid is converted into a preferentially water soluble fluorine compound. At the same time, the acidity is kept high enough that only a minor part, substantially none if desired, of the fluotantalic acid is rendered soluble in the aqueous solution. The result is to produce a separation of the columbium and tantalum values when the aqueous and organic solvent phases, respectively, are taken from opposite ends of the countercurrent extraction system.

The acid concentration of the aqueous scrub solution is preferably about 1 N. Good results are obtained with an acid concentration of about 0.5 N to about 4 N, however, and it is possible to employ an aqueous solution having a normality falling even outside this range if appropriate adjustments are made, in a manner well known in the art, in the scrub solution flow rate or number of stages employed.

The normality of the aqueous scrub solution should be, for best results, higher for larger proportions of tantalum value in the feed solution for this second step.

When an extract from the first step of the method of this invention having a concentration of about 280 grams combined oxides per liter and a $Ta_2O_5$ to $Cb_2O_5$ ratio of about 1 is fed into the extraction system of the second step of the method, the proper flow rate—in order to achieve sharpest mutual separation of columbium and tantalum—for both methyl isobutyl ketone, for example, and the aqueous scrub (1 N) is about two-thirds the flow rate of the extract. If the normality of the aqueous scrub is high, a higher flow rate of aqueous scrub is required. As the $Cb_2O_5$ to $Ta_2O_5$ ratio increases above 1, a higher flow rate of aqueous scrub and a lower flow rate of organic scrub are required. Likewise, as the $Ta_2O_5$ to $Cb_2O_5$ ratio increases above 1, a lower flow rate of aqueous scrub and a higher flow rate of organic scrub are required.

CONTROL OF PROPORTIONS OF COLUMBIUM AND TANTALUM

Control of the acidity of the extraction system of the second step according to principles well known in the art makes it possible, within certain limits, to separate out as the end products of the second step desired proportions of columbium and tantalum values.

If the acidity of the system is high enough, the aqueous raffinate will contain only columbium value, with substantially no tantalum value in this phase. In this case, the organic extract may contain, together with the fluotantalic acid, a proportion of unconverted fluocolumbic acid, the size of which depends upon the relative proportions of the two values in the starting material and the precise pH maintained in this second step.

If the acidity of the system is made low enough, the fluocolumbic acid will be substantially all converted to a water soluble compound, and thus substantially all of the columbium value will be removed from the organic phase to the aqueous phase. In this case, the organic extract will contain substantially only fluotantalic acid, while the aqueous raffinate will contain, in addition to the columbium value, a proportion of fluotantalic acid depending upon the original proportions of columbium and tantalum in the starting material and the precise pH used in the extraction system.

To increase the acidity of the extraction system of the second step, one may (1) increase the normality of the aqueous scrub solution, (2) decrease the flow rate of the organic solvent with respect to the feed solution, and/or (3) decrease the flow rate of the aqueous scrub solution with respect to the feed solution. To lower the acidity of the extraction system, one may make the reverse of one or more of these adjustments.

SEPARATION OF TANTALUM VALUE

In the third step of the method of this invention, the organic extract from the second step is mixed with a clean aqueous scrub solution. The scrub used is preferably water but may be, if desired, a dilute solution of a mineral acid selected from the group specified above. The mixing is effected in a multi-stage, single solvent, liquid-liquid extraction system.

The acidity of the mixed scrub solution and the organic solvent phase in this third step is sufficiently less than was then acidity of the mixture in the second step that substantially all the fluotantalic acid is rendered preferentially soluble in the aqueous scrub solution.

As will be obvious to one skilled in the art, the flow rate of the feed solution and scrub solution may suitably be of about the same order of magnitude. This ordinarily produces an aqueous raffinate containing $Ta_2O_5$ in a concentration of about 80 to 120 grams per liter.

The aqueous and organic solvent phases of this third extraction system are then separated, with the tantalum value going with the aqueous raffinate.

The tantalum may be recovered from the aqueous raffinate by conventional methods, just as the columbium is recovered in the conventional way from the aqueous solution resulting from the second extraction step of the method. The organic extract may be recycled for use as the organic scrub solvent in the first or second step of the method, or as the solvent for preparation of an organic feed solution for the first step.

THE DRAWINGS

Figure 2:
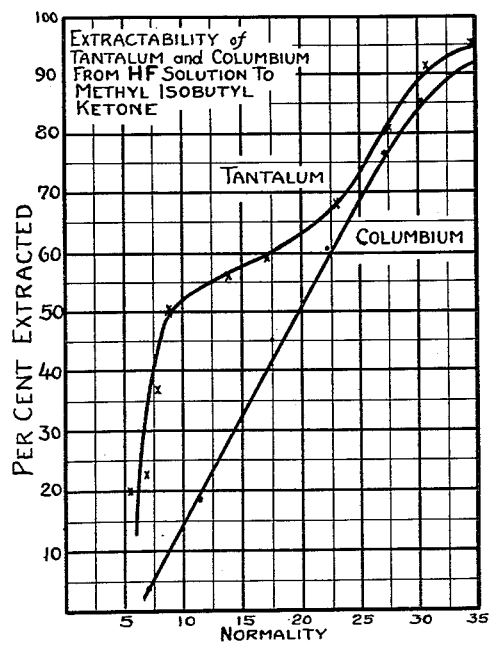

The method of this invention will be more specifically described by reference to the drawing, in which:

FIG. 1 is a flow chart showing the various steps in the method of this invention; and FIG. 2 is a graph showing the differences in extractability of columbium and tantalum from a hydrofluoric acid solution to methyl isobutyl ketone at various normalities.

FLOW OF LIQUIDS THROUGH MIXER-SETTLER UNIT IN FIRST STEP OF METHOD

A preferred form of mixer-settler unit for use with the method of this invention is a multiple stage mixer-settler extractor of twelve mixing and twelve settling chambers.

The flow of liquids through such a mixer-settler unit will now be explained, first with respect to the initial step of the method of this invention and then successive steps.

In the first, or purification, step of the method in the form being described, the feed solution is introduced into a mixing chamber intermediate the two ends of the apparatus. The organic solvent is introduced into the mixing chamber at one end of the appaartus, while the aqueous scrub solution is introduced into the mixing chamber at the opposite end of the unit.

For the reasons stated above, the quantity of aqueous scrub solution employed is substantially less than the quantity of feed solution introduced into the mixer-settler unit, and with an aqueous feed solution the quantity of organic solvent employed is greater than the amount of feed solution. The respective flow rates of the organic solvent, aqueous feed solution, and aqueous scrub solution may suitably be, for example, about ten, five and one units of volume for a given time. With such proportions, it is desirable to provide more stages of washing of the feed solution by the organic solvent than the number of stages provided for scrubbing of the feed by the aqueous scrub solution. Under the circumstances described, the intermediate mixing chamber into which the feed solution is introduced is preferably located farther from the end of the apparatus into which the organic solvent is introduced than it is from the end into which the aqueous scrub solution is introduced. For example, in the 12 stage unit being described, the organic solvent may wash the feed solution through eight stages, while on the other hand, the feed solution is scrubbed by the aqueous scrub solution through only five stages.

The feed solution, organic solvent and aqueous scrub solution may, if desired, be introduced into mixing chambers at other stages of the mixer-settler unit besides those just suggested. To make this possible, additional inlet apertures may be provided, as desired.

In the apparatus being described, the aqueous raffinate, containing various impurities such as titanium, iron, silicon, aluminum, etc., is removed at an outlet aperture at the end of the apparatus into which the organic solvent is introduced. The organic phase is removed from the mixer-settler unit at an outlet aperture at the other end of the apparatus. As a result of the continuous countercurrent double solvent extraction in this step, columbium and tantalum values are transferred from the feed solution to the organic phase, thereby increasing the volume of the organic output from the apparatus to about 13 units as compared to the flow rate of ten units in the organic solvent as introduced. Transfer of the impurities to the aqueous raffinate increases the volume of the output of that material to about three units.

As the feed solution is introduced into the intermediate mixing chamber of the mixer-settler apparatus as described above, it becomes intimately intermixed with the organic solvent which originated at one end of the apparatus and also with the aqueous scrub solution which originated at the other end of the unit, thereby resulting in a countercurrent double solvent extraction process in that particular stage.

The same countercurrent double solvent extraction process goes on continuously and simultaneously in all the other stages of the twelve stage mixer-settler unit.

The double solvent extraction process in the series of mixing and settling chambers which lie between the inlet of the twelve stage mixer-settler apparatus and the respective outlet apertures at either end of the apparatus will have a cumulative effect upon the liquid passing through each such series of stages. Moreover, the cumulative effect will grow according to a geometric progression.

Consider as an example the effect of the intimate intermixing of methyl isobutyl ketone with a solution of fluocolumbic acid at a normality of about 20. As will be seen from FIG. 2 of the drawing, the percent of columbium value extracted to the methyl isobutyl ketone phase as a result of a single contact, assuming that contact is complete, will be approximately one-half at this normality. In other words, approximately one-half of the columbium presented to a given pair of mixing and settling chambers in the twelve stage apparatus will remain in the aqueous fluocolumbic acid solution that leaves that pair of chambers.

Thus, in the apparatus referred to just above in which the feed solution is washed by the organic solvent through eight stages, the amount of columbium value remaining in the aqueous phase at the tend of those eight stages will be $(\frac{1}{2})^8$ of the amount presented at the first stage, or in other words $\frac{1}{256}$ or just less than 0.4 percent of the original columbium value. This means that approximately 99.6 percent of the columbium is removed to the organic phase after passing through the described eight stages of this apparatus.

Even at a lower normality, such as approximately 13, adequate removal of columbium value may be obtained in this step of the process. The graph of FIG. 2 shows that with a complete intermixing at this normality approximately 25 percent of the columbium value is extracted to the methyl isobutyl ketone phase, or in other words, about ¾ of the columbium presented to any given stage remains in the aqueous phase on the output side. Here, again, the effect of the double solvent extraction is felt as a geometric progression, and therefore if the number of stages is made large enough the removal of columbium value is entirely adequate.

If the number of stages is doubled, for example, so that the organic solvent washes the feed solution through sixteen stages, the amount of columbium remaining in the aqueous phase at the output side of the last stage will be $(\frac{3}{4})^{16}$, or in other words approximately one percent. The extraction of 99 percent of columbium to the organic phase is a quite useful result, and doubling the number of stages in the mixer-settler apparatus is entirely feasible.

FLOW OF LIQUID IN THE MIXER-SETTLER UNIT IN SECOND STEP

The second step of the method of this invention results in an aqueous raffinate containing columbium value and substantially no tantalum value or, if desired, a minor portion of tantalum.

The organic extract resulting from the first step is introduced into an intermediate mixing chamber of a second mixer-settler extractor unit as the feed solution for the second step. The organic solvent is introduced into the mixing chamber at one end of the mixer-settler apparatus, and the aqueous scrub solution is introduced into the mixing chamber at the other end of the unit.

The effective intermixing with a given solvent occurs between the stage at which the feed solution is introduced and the inlet for the solvent in question. There is a tendency for the tantalum value in the feed solution to be carried along with the columbium value into the aqueous raffinate; it is desirable to oppose this tendency by means of a thorough washing with the organic scrub solvent. Therefore, in this step as in the first step the intermediate stage at which the feed solution is introduced is preferably farther from the organic scrub solvent inlet than it is from the aqueous scrub solution inlet.

With about ten units of volume of feed solution introduced during a given period of time in this second step, an aqueous scrub solution and organic solvent, such as methyl isobutyl ketone, in respective amounts of about seven and five units for the same period of time will be suitable.

The aqueous raffinate, containing principally or substantially entirely columbium value, is removed from an outlet at the end of the mixer-settler apparatus at which the organic solvent is introduced. The organic extract, containing principally or substantially entirely tantalum value, is removed at an outlet at the other end of the unit.

LIQUID FLOW IN THIRD STEP

In the third step of this invention, the tantalum is extracted to the aqueous raffinate.

The feed solution employed is the organic extract from the second step of the method. It may be introduced at or near one end of a mixer-settler extractor apparatus of the type employed in the first two steps. Aqueous scrub solution is introduced at substantially the same flow rate as the feed solution at the other end of the apparatus.

The aqueous raffinate containing substantially all the tantalum value is removed from the settling chamber associated with the mixing chamber into which the organic extract is introduced.

FLOW CHART

FIG. 1 is a flow chart representing the extraction system of the three successive steps of the basic method of this invention. The figure represents diagrammatically the steps which have been described above. The mixer-settler unit employed in each step is labelled in FIG. 1 with the number of the particular step involved.

The arrows indicate schematically the input and output of the mixer-settler unit in the respective steps. Thus, the organic solvent which was described above as being introduced in the first step at one end of the mixer-settler unit is represented by the arrow in the upper left hand corner of the box labelled "Step 1." As explained above, the feed solution is introduced in the first step at an intermediate stage of the apparatus, and the aqueous scrub solution is introduced in that step at the end of the apparatus opposite the point of introduction of the organic solvent. Introduction of these two materials is represented by the respective arrows at an intermediate position and in the upper right hand corner of the same box. Another arrow represents the aqueous raffinate containing various impurities, and still another the organic phase containing columbium and tantalum.

The latter arrow from the box labelled "Step 1" also represents the input for the mixer-settler unit labelled "Step 2." This input corresponds to the feed solution introduced at one end of in the apparatus described above for the second step of the method of this invention.

The remaining arrows of the boxes labelled "Step 2" and "Step 3" have the significance indicated by the legends accompanying the arrows. As is seen, the aqueous raffinate from Step 2 contains columbium and the aqueous raffinate from Step 3 contains tantalum—the end products of the method of this invention.

AQUEOUS STARTING MATERIAL FOR THE METHOD OF THIS INVENTION

A preferred method of preparing the aqueous solution that may be employed as the starting material for the method of this invention is as follows:

The columbite-tantalite ore concentrate is pulverized, ground to 200 mesh, and fused with caustic. The fused product is leached with water to give a brown residue. The brown residue is digested with hydrochloric acid to give a white residue. The white residue is washed with water to remove acid, filtered, and then dried to constant weight at 130° C. The resulting material is sometimes referred to in this specification as "dried white mud."

The dried residue is dissolved in 70 percent hydrofluoric acid to give a concentrated aqueous fluoride solution of columbium, tantalum, and impurities, such as titanium, iron, silicon, aluminum, etc. The concentrated aqueous solution thus prepared is a preferred starting material for use with the method of this invention.

A qualitative analysis of a typical impure "white mud" from which the feed solution for the method of this invention is suitably prepared was made by emission spectrograph. The analysis showed:

| | |
|---|---|
| Titanium—Ti | Weak. |
| Iron—Fe | Very weak. |
| Silicon—Si | Do. |
| Aluminum—Al | Do. |
| Zirconium—Zr | Trace. |
| Calcium—Ca | Very weak. |
| Sodium—Na | Trace. |
| Tin—Sn | Weak. |
| Manganese—Mn | Trace. |
| Magnesium—Mg | Do. |
| Tantalum—Ta | Strong. |
| Tungsten—W | Very weak. |
| Molybdenum—Mo | Trace. |
| Lead—Pb | Do. |
| Columbium—Cb | Strong. |

EXAMPLES

The following examples will more particularly show the detailed practice of this invention, but are not to be considered as limiting:

Example 1

As already pointed out above, the extraction of fluocolumbic and fluotantalic acids from an aqueous solution to an organic solvent, such as methyl isobutyl ketone, as in the first step of the method of this invention, is most complete when the normality of the aqueous feed solution is high. This is demonstrated by an experiment in which various hydrofluoric acid solutions of columbium and tantalum are contacted with methyl isobutyl ketone. FIG. 2 gives a graph of the results of the experiment.

A feed solution of fluotantalic acid was prepared by dissolution of the hydrated oxide in 70 percent hydrofluoric acid. The oxide was added to the saturation point. A number of one-stage extractions were then carried out by taking 10 ml. of the feed solution and diluting with water to the desired normality and contacting with 20 ml. of methyl isobuty ketone. The percent of material extracted to the organic phase was determined. Similarly, a feed solution of fluocolumbic acid was prepared and a number of extractions made at various normalities. The results were plotted on the graph.

The curves show a similarity of extraction of columbium and of tantalum at high hydrofluoric acid normality. However, as normality decreases the curves differ greatly. The graph indicates that as long as the normality of the aqueous hydrofluoric acid solution is 20 or higher at least half of the columbium and tantalum is extracted to the organic phase with one contact. In order to feasibly extract all of the columbium from an aqueous hydrofluoric acid solution even by multiple extraction methods the normality ought to be somewhat higher than 20. An extraction system of just a few stages would require high normality and/or low water content. If one is principally interested in tantalum a complete extraction can be obtained at somewhat lower normality and/or with fewer stages of extraction.

At a normality of 10 at least 50% of tantalum is extracted from the aqueous feed solution, but only a small percent of columbium is extracted at this normality. This great difference in the curves for the two elements shown in FIG. 2 explains the successful separation of tantalum and columbium in the second extraction step of the method of this invention, when columbium is back-extracted from the organic extract by use of an aqueous phase. Even at a normality of 6 to 8 the organic solvent extracts a considerably higher proportion of the tantalum than of the columbium; therefore, on a back-extraction the organic solvent ought to retain the tantalum while columbium is selectively back-extracted to an aqueous phase.

*Example 2*

This example shows that various organic solvents may be introduced at one end of the double solvent counter-current extraction system in the first step of the method of this invention.

A hydrofluoric acid solution of fluocolumbic and fluotantalic acid was prepared which had a hydrofluoric acid concentration of about 32 N. The concentration of this aqueous feed solution was about 700 grams oxide per liter.

To compare the extraction ability of methyl isobutyl ketone, tributyl phosphate, diisobutyl ketone, diethyl ketone and cyclohexone, some single stage contacts were made. Fifty ml. of aqueous feed solution prepared as just described was contacted with 100 ml. of organic solvent. After a separation of phases, the oxide was recovered from an aliquot of each phase. The percent of oxide (combined columbium and tantalum) extracted to the organic phase when the various organic solvents were used are given in the following table:

| Organic solvent: | Percent extracted |
|---|---|
| Methyl isobutyl ketone | 93 |
| Tributyl phosphate | 68 |
| Diisobutyl ketone | 64 |
| Cyclohexone | 54 |
| Diethyl ketone | 88 |

In order to illustrate that these organic solvents not only will extract the columbium and tantalum from a highly concentrated hydrofluoric acid solution but that columbium and tantalum can also be preferentially separated from the organic extracts, some back-extractions were made. Twenty ml. of each of the extracts was intimately mixed with 10 ml. of 1 N $H_2SO_4$. After the back-extraction the phases were separated, and the oxides were recovered, weighed and analyzed.

The results are summarized in the table below. The percent of $Ta_2O_5$ and the percent of $Cb_2O_5$ are expressed in terms of the respective amounts of each which were present in the organic phase before back-extraction. It is seen that in each instance the columbium value is more soluble than the tantalum in the aqueous scrub solution, and therefore the columbium value can be preferentially extracted from the organic to the aqueous phase of the mixture.

| | Percent of Combined $Ta_2O_5$ and $Cb_2O_5$ Back-Extracted to Aqueous Phase | Percent $Ta_2O_5$ Extracted | Percent $Cb_2O_5$ Extracted |
|---|---|---|---|
| Methyl isobutyl ketone | 34 | 12 | 63 |
| Tributyl phosphate | 28 | 5 | 60 |
| Diisobutyl ketone | 71 | 53 | 93 |
| Cyclohexone | 46 | 34 | 58 |
| Diethyl ketone | 30 | 3 | 56 |

*Example 3*

This example shows that various mineral acids may be employed in the aqueous scrub solution of the first step of the method of this invention.

A methyl isobutyl ketone extract solution which contained fluocolumbates, fluotantalates, and fluoride impurities of titanium and iron was prepared by contacting two volumes of ketone with one volume of aqueous feed solution made from columbite-tantalite ore by the method explained above in this specification and having a hydrofluoric acid concentration of about 32 N. The analysis of the resulting ketone extract solution was as follows:

[200 grams oxide per liter]

| | Percent |
|---|---|
| Fe | 4.5 |
| $Cb_2O_5$ | 28 |
| $Ta_2O_5$ | 67 |
| $TiO_2$ | 0.03 |

Portions of the extract solution were used for some back-extraction tests. Twenty ml. extract solution was contacted with 4 ml. 12 N acid solution. After the extraction the oxide was recovered from the organic phase. Tests were made with various acids.

In each case there was a preferential back-extraction of iron and titanium to the aqueous phase. The percent of oxide remaining in the organic phase and the percent of iron and titanium dioxide in the organic phase is given for the various acids in the following table:

| Acid | Percent Oxide not Extracted to Aqueous Phase | Percent Iron | Percent Titanium Dioxide |
|---|---|---|---|
| 12 N $H_2SO_4$ | 95 | 0.09 | 0.006 |
| 12 N $H_3PO_4$ | 90 | 0.217 | 0.005 |
| 12 N $HNO_3$ | 90 | 0.295 | 0.005 |
| 12 N HF | 91 | 0.150 | 0.018 |
| 12 N HCl | 91 | 1.95 | 0.010 |

*Example 4*

In this example the method of this invention was used to produce solutions of substantially pure columbium and tantalum values, respectively, from a columbite-tantalite ore.

The starting material was an aqueous feed solution prepared from a typical "white mud" in the manner described above in this specification. The aqueous feed solution used in the example had the following analysis:

[650 grams oxide per liter]

| | Percent |
|---|---|
| $Ta_2O_5$ | 49 |
| $Cb_2O_5$ | 50 |
| $TiO_2$ | 1.00 |
| Fe | 0.50 |

A twelve-stage mixer-settler unit of the type described above was employed in this example. The organic solvent was introduced in stage 1, the aqueous scrub solution at stage 12, and the aqueous feed solution intermediate these two at stage 8. The feed rates for the first extraction were as follows:

| | Ml./min. |
|---|---|
| Methyl isobutyl ketone | 2000 |
| Aqueous feed | 1000 |
| 6M $H_2SO_4$ | 100 |

The organic extract resulting from this first step contained less than 0.005 percent Fe, less than 0.005 percent $TiO_2$, less than 0.02 percent of all other metal impurities, and 255 grams of oxide per liter.

This organic extract from the first step was introduced into a mixer-settler unit for the second extraction step, in accordance with the method of the invention, as follows:

|  | Ml./min. |
|---|---|
| Methyl isobutyl ketone (Stage 1) | 1000 |
| Organic extract (Stage 8) | 2000 |
| Acid scrub—3.5 N H$_2$SO$_4$ (Stage 12) | 1500 |

The analysis of the resulting products from this second extraction step was as follows:

|  | Percent |
|---|---|
| Ta$_2$O$_5$: |  |
|   Cb raffinate (aqueous phase) | 1–3 |
| Cb$_2$O$_5$: |  |
|   Ta extract (organic phase) | 0.14–0.20 |

The tantalum value in the organic phase from the second step was then extracted to an aqueous phase, in accordance with the third step of this invention, by employing water in a countercurrent extraction step.

*Example 5*

In this example the procedure of Example 4 was repeated, except that 1 N H$_2$SO$_4$ replaced the 3.5 N H$_2$SO$_4$ in the second step, under the following conditions:

|  | Ml./min. |
|---|---|
| Methyl isobutyl ketone (Stage 1) | 1000 |
| Organic extract (Stage 8) | 2000 |
| Acid scrub—1 N H$_2$SO$_4$ (Stage 12) | 1500 |

The analysis of the products resulting from the second step of the method was as follows:

|  | Percent |
|---|---|
| Ta$_2$O$_5$: |  |
|   Cb raffinate (aqueous phase) | 0.05–0.10 |
| Cb$_2$O$_5$: |  |
|   Ta extract (organic phase) less than | 0.02 |

*Example 6*

Three mixer-settler units were operated in series for this example, each being used for a successive step in the method of this invention. The aqueous feed solution for the first step had the following analysis:

[755 grams oxide per liter]

|  | Percent |
|---|---|
| Ta$_2$O$_5$ | 58 |
| Cb$_2$O$_5$ | 39 |
| TiO$_2$ | 2.60 |
| Fe | 0.55 |

The operation of each mixer-settler unit and the results of each step were as follows:

1st BOX

Feed rates:

| Methyl isobutyl ketone | ml./min | 1200 |
|---|---|---|
| 6 M H$_2$SO$_4$ | ml./min | 200 |
| Aqueous feed | ml./min | 600 |

Results:

| Extract | ml./min | 1660 |
|---|---|---|
| Fe | percent | 0.005 |
| TiO$_2$ | do | 0.02 |
| Others | do | 0.02 |
| Raffinate | ml./min | 340 |

2nd BOX

Feed rates:

| Methyl isobutyl ketone | ml./min | 1000 |
|---|---|---|
| 1 N H$_2$SO$_4$ | ml./min | 1000 |
| Organic feed | ml./min | 1600 |

Results:

| Extract | ml./min | 2600 |
|---|---|---|
| Cb raffinate | ml./min | 1000 |
| Cb$_2$O$_5$ | percent | 99.8+ |
| Ta$_2$O$_5$ | do | 0.15–0.20 |

3rd BOX

Feed rates:

| Extract feed | ml./min | 2600 |
|---|---|---|
| H$_2$O | ml./min | 2600 |

Results:

| Extract | ml./min | 2200 |
|---|---|---|
| Ta$_2$O$_5$ | grams/liter | 5 |
| Ta raffinate | ml./min | 3000 |
| Ta$_2$O$_5$ | percent | 99.9+ |
| Cb$_2$O$_5$ | do | 0.05–0.09 |

*Example 7*

In this example the procedure of Example 6 was repeated with the same results except that the columbium raffiniate from the second step and the tantalum raffinate from the third step contained the following percentages of the other value which was present:

|  | Percent |
|---|---|
| Ta$_2$O$_5$: |  |
|   Cb raffinate | 0.12–0.15 |
| Cb$_2$O$_5$: |  |
|   Ta raffiniate | 0.05–0.06 |

*Example 8*

In this example the procedure of Example 6 was repeated, except that the reaction conditions and results for the second and third steps were as follows:

2nd BOX

Feed rates:

| Methyl isobutyl ketone | ml./min | 1150 |
|---|---|---|
| 1 N H$_2$SO$_4$ | ml./min | 950 |
| Organic feed | ml./min | 1600 |

Results:

| Extract | ml./min | 2750 |
|---|---|---|
| Cb raffinate | ml./min | 960 |
| Cb$_2$O$_5$ | percent | 99.9+ |
| Ta$_2$O$_5$ | percent | 0.05–0.06 |

3rd BOX

Feed rates:

| Extract feed | ml./min | 2750 |
|---|---|---|
| H$_2$O | ml./min | 2700 |

Results:

| Extract | ml./min | 2300 |
|---|---|---|
| Ta$_2$O$_5$ | grams/liter | 5 |
| Ta raffinate | ml./min | 3000 |
| Ta$_2$O$_5$ | percent | 99.9+ |
| Cb$_2$O$_5$ | do | 0.07 |

*Example 9*

In this example the procedure of Example 6 was repeated, except that the starting material contained equal amounts of Cb$_2$O$_5$ and Ta$_2$O$_5$.

A tantalum raffinate product which contained 2% Cb$_2$O$_5$ was obtained when an aqueous feed containing the 50–50 mixture of Cb$_2$O$_5$ and Ta$_2$O$_5$ was passed through the boxes as follows:

1st BOX

|  | Ml./min. |
|---|---|
| Methyl isobutyl ketone | 1400 |
| Aqueous feed | 660 |
| 6 M H$_2$SO$_4$ | 200 |

2nd BOX

| Methyl isobutyl ketone | 1150 |
|---|---|
| 1 N H$_2$SO$_4$ | 900 |
| Organic feed | 1700 |

3rd BOX

| Water | 2600 |
|---|---|

The resulting products from the second and third stages, respectively, had the following analyses:

|  | Cb Raffinate, percent | Ta Raffinate, percent |
|---|---|---|
| $Ta_2O_5$ | 0.06 | 97.5 |
| $Cb_2O_5$ | 99.9 | 2 |
| $TiO_2$ | 0.01 | 0.02— |
| Fe | 0.005— | 0.006 |
| $ZrO_2$ | 0.05— | 0.05— |

*Example 10*

In this example the aqueous feed solution had the following analysis:

[650 grams oxide per liter]

| | Percent |
|---|---|
| $Ta_2O_5$ | 47 |
| $Cb_2O_5$ | 50 |
| $TiO_2$ | 1.00 |
| Fe | 0.43 |

An eight stage extraction was carried out, using the first step of the method of this invention, as follows:

| | Ml./min. |
|---|---|
| Methyl isobutyl ketone (Stage 1) | 2000 |
| Aqueous feed (Stage 5) | 1000 |
| 6 M $H_2SO_4$ (Stage 8) | 200 |

The organic extract resulting from this first step contained less than 0.005 percent Fe and less than 0.005 percent $TiO_2$, less than 0.02 percent of all other metal impurities, and 255 grams of oxide per liter.

This organic extract from the first step was introduced into a mixer-settler unit for the second extraction step, in accordance with the method of the invention, as follows:

| | Ml./min. |
|---|---|
| Methyl isobutyl ketone (Stage 1) | 1000 |
| Organic extract (Stage 8) | 2000 |
| Acid scrub—3.5 N $H_2SO_4$ (Stage 12) | 1500 |

The analysis of the resulting products from this extraction step was as follows:

Percent $Ta_2O_5$:
   Cb raffinate (aqueous phase) _____ 0.14–0.185

$Cb_2O_5$:
   Ta extract (organic phase) _____ 0.125–0.130

*Example 11*

The procedure of Example 10 was repeated, except that the aqueous acid scrub used in the second step was 1 N $H_2SO_4$, with the following results:

Percent $Ta_2O_5$:
   Cb raffinate (aqueous phase) _____ 0.08–0.11

$Cb_2O_5$:
   Ta extract (organic phase) _____ 0.38–0.42

*Example 12*

In this example the procedure of Example 10 was followed, employing an aqueous feed solution having the following analysis:

[650 grams oxide per liter]

| | Percent |
|---|---|
| $Ta_2O_5$ | 49 |
| $Cb_2O_5$ | 50 |
| $TiO_2$ | 1.00 |
| Fe | 0.50 |

The reaction conditions for the first step were as follows:

| | Ml./min. |
|---|---|
| Methyl isobutyl ketone (Stage 1) | 2000 |
| Aqueous feed (Stage 5) | 1000 |
| 6 M $H_2SO_4$ (Stage 8) | 100 |

Ninety-seven percent of the total columbium and tantalum in the feed solution was transferred to the organic extract, which contained less than 0.005 percent Fe and less than 0.005 percent $TiO_2$.

The second step was carried out as follows:

| | Ml./min. |
|---|---|
| Methyl isobutyl ketone (Stage 1) | 1000 |
| Organic extract (Stage 8) | 2000 |
| 1 N $H_2SO_4$ | 1500 |

The organic extract from the second step was washed with water to extract the tantalum.

The resulting products of the method of this invention had the following analyses:

| | Cb Raffinate, percent | | Ta Raffinate, percent |
|---|---|---|---|
| $Ta_2O_5$ | 0.05–0.10 | $Cb_2O_5$ | 0.03 |
| $TiO_2$ | 0.005–0.01 | $TiO_2$ | 0.005 |
| Fe | 0.005 | Fe | 0.005 |
| $Cb_2O_5$ | balance | $Ta_2O_5$ | balance |

ORGANIC STARTING MATERIAL FOR THE METHOD OF THIS INVENTION

As indicated above, the starting material for use with the method of this invention may be, if desired, a highly concentrated solution of fluocolumbic acid and fluotantalic acid in an organic solvent selected from the group consisting of methyl isobutyl ketone, diethyl ketone, cyclohexone, diisobutyl ketone, tributyl phosphate, and mutually soluble mixtures thereof.

An example of a preferred method for preparing such an organic starting material for use with the method of this invention is as follows:

A reacted slurry was made by dissolving finely pulverized ore in 70% hydrofluoric acid. The ore contained 35.6% $Cb_2O_5$ and 36.4% $Ta_2O_5$. The ore was added to the acid in the proportions of one kilogram of ore to 1.25 kilograms of acid.

The reacted slurry was intimately contacted with two successive portions of methyl isobutyl ketone. The resulting organic extracts were combined to give a feed solution of the following analysis:

[256 grams of oxide per liter]

| | Percent |
|---|---|
| $Ta_2O_5$ | 51 |
| $Cb_2O_5$ | 48.5 |
| Fe | 0.43 |
| $TiO_2$ | 0.04 |
| Others | Less than 1 |

*Example 13*

In this example, an organic feed solution prepared as just described was fed to Box I of a three box system in which each box was used for a successive step of the method of this invention. Each box consisted of a twelve-stage mixer-settler unit of the type described above in this specification. The flow rates in Box I were:

| | Ml./min. |
|---|---|
| Methyl isobutyl ketone (Stage 1) | 400 |
| Organic feed (Stage 8) | 2000 |
| 6 M $H_2SO_4$ (Stage 12) | 400 |

The organic extract resulting from this step contained less than 0.005 percent Fe, less than 0.005 percent $TiO_2$, and less than 0.01 percent other impurities. The aqueous raffinate resulting from this step contained less than 0.5 percent of total concentration of combined $Ta_2O_5$ and $Cb_2O_5$.

The organic extract from Box I was fed into Box II, where the flow rates were:

| | Ml./min. |
|---|---|
| Methyl isobutyl ketone (Stage 1) | 1200 |
| Organic extract (Stage 8) | 2300 |
| 1 N $H_2SO_4$ (Stage 12) | 1400 |

The columbium raffinate resulting from this step contained 0.68 percent $Ta_2O_5$.

The organic extract from Box II was fed into Stage 1 of Box III at a flow rate of 2900 ml./min. The flow rate of water into Stage 12 of Box III was 3200 ml./min. The tantalum raffinate resulting from this step contained 0.034 percent $Cb_2O_5$.

*Example 14*

This example shows that various organic solvents may be employed in the preparation of the organic starting material for the method of this invention.

A reacted slurry was made by dissolving finely pulverized ore in 70% hydrofluoric acid in the proportions of one kilogram of ore per 1.25 kilogram of 70% hydrofluoric acid. Analysis of the ore is as follows:

| | |
|---|---|
| $Ta_2O_5$ | 22.73 |
| $Cb_2O_5$ | 51.77 |
| $TiO_2$ | 1.60 |
| $SiO_2$ | 1.57 |
| Fe | 10.32 |
| Mn | 3.03 |

In order to show that methyl isobutyl ketone, tributyl phosphate, diisobutyl ketone, diethyl ketone and cyclohexone will extract tantalum and columbium in substantial amounts from such a reacted slurry but will extract only small amounts of impurities, some single stage contacts were made. 100 ml. of reacted slurry was intimately contacted with 100 ml. of the respective organic solvents. In each instance, after separation of the aqueous and organic phases the oxide was recovered from the organic phase. The results of the analysis of the organic phase resulting from the single stage extraction are given in the following table for the various solvents tested:

| | gms./l. | Percent $Ta_2O_5$ | Percent $Cb_2O_5$ | Percent Fe | Percent $TiO_2$ | Percent Others |
|---|---|---|---|---|---|---|
| Methyl isobutyl ketone | 300 | 41 | 58 | 0.58 | 0.03 | (1) |
| Tributyl phosphate | 200 | 40 | 59 | 0.66 | 0.066 | (1) |
| Diisobutyl ketone | 160 | 42 | 58 | 0.09 | 0.005 | (1) |
| Cyclohexone | 140 | 30 | 69 | 0.36 | 0.06 | (1) |
| Diethyl ketone | 220 | 42 | 57 | 0.93 | 0.05 | (1) |

[1] Less than 1.

In order to illustrate that these organic solvents not only will extract columbium and tantalum from a slurry of pulverized ore in hydrofluoric acid, but that columbium and tantalum can also be preferentially separated from the organic extracts, some back extractions were made. 20 ml. of each of the organic extracts was intimately contacted with 10 ml. of 1 N $H_2SO_4$. After the back extraction the phases were separated, and the oxides recovered, weighed, and analyzed. The results are summarized in the table below.

In the table the percentage of $Ta_2O_5$ and the percentage of $Cb_2O_5$ are expressed in terms of the respective amounts of each which were present in the organic phase before back extraction. It is seen that in each case the columbium value is more soluble in the aqueous solution than the tantalum value is—or in other words, the columbium can be preferentially extracted to the aqueous phase.

| | Percent of Combined $Ta_2O_5$ and $Cb_2O_5$ Back Extracted to Aqueous Phase | Percent $Ta_2O_5$ Extracted | Percent $Cb_2O_5$ Extracted |
|---|---|---|---|
| Methyl isobutyl ketone | 49 | 30 | 63 |
| Tributyl phosphate | 34 | 5 | 54 |
| Diisobutyl ketone | 70 | 49 | 84 |
| Cyclohexone | 45 | 35 | 55 |
| Diethyl ketone | 40 | 6 | 70 |

SUPPLEMENTAL EXTRACTION OF COLUMBIUM FROM AQUEOUS RAFFINATE RESULTING FROM SECOND STEP

As explained above, if the acidity of the extraction system of the second step of the method of this invention is made low enough, the organic phase resulting from this step will contain substantially only fluotantalic acid, and the aqueous phase will contain a small proportion of fluotantalic acid in addition to the columbium value.

In this situation, the tantalum value recovered from the third step of the method of this invention is of very high purity. If the aqueous raffinate from the second step is introduced into another or supplemental extraction system generally similar to the extraction system of the second step, the small proportion of fluotantalic acid contained in the aqueous raffinate will be substantially all extracted to the organic phase of the supplemental system, and the resulting columbium in the aqueous phase from this supplemental step will also be of very high purity.

The supplemental extraction step in this modification of the method of the invention may be designated as a fourth step of the invention, although it is of course only the third double solvent extraction system used in the method. The flow rates, acidity, and other conditions of operation of the double solvent countercurrent extraction system of the fourth step should preferably be substantially the same as in the second step of the basic three-step method previously described in this specification.

The organic extract from the fourth or supplemental extraction step may be recycled to the double solvent countercurrent extraction system of the second step for use as the organic solvent to be introduced at one end of that system.

*Example 15*

In this example, the final tantalum value was contained in the aqueous raffinate from Box III of a four box system in which the fourth box was used for the supplemental step just described. Hence the final columbium value was contained in the aqueous raffinate from Box IV of the four box system. The final tantalum solution contained 0.02% of $Cb_2O_5$, and the final columbium solution contained 0.03% $Ta_2O_5$.

An organic feed solution of the following analysis was introduced into Box I:

[250 grams oxide per liter]

| | Percent |
|---|---|
| $Ta_2O_5$ | 40 |
| $Cb_2O_5$ | 59 |
| Fe | 0.45 |
| $TiO_2$ | 0.06 |
| Others | Less than 1 |

The feed rates employed in the first step of the method of the invention in this example were:

| | Ml./min. |
|---|---|
| Methyl isobutyl ketone (Stage 1) | 400 |
| Organic feed (Stage 8) | 1800 |
| 6 M $H_2SO_4$ (Stage 12) | 300 |

Analysis of samples of the extract taken at random from the output end of Box I showed:

| | |
|---|---|
| Fe | Less than 0.005%. |
| $TiO_2$ | Do. |
| Ni | Do. |
| $ZrO_2$ | Less than 0.05%. |
| Others | Do. |

The extract from Box I was fed continuously to Stage 5 of Box II at approximately 2100 ml./min., with methyl isobutyl ketone and 1 N $H_2SO_4$ fed into Box II as follows:

| | Ml./min. |
|---|---|
| Methyl isobutyl ketone (Stage 1) | 1200 |
| 1 N $H_2SO_4$ (Stage 12) | 1400 |

Analysis of samples of the tantalum extract and columbium raffinate taken at random from the organic and aqueous outputs, respectively, of Box II showed:

|  | Tantalum Extract, Percent | Columbium Raffinate, Percent |
|---|---|---|
| $Ta_2O_5$ | 99.9+ | 13 |
| $Cb_2O_5$ | 0.02 | 87 |

The organic extract from Box II was fed continuously to Stage 1 of Box III. The feed rate of water to Stage 12 of Box III was 3200 ml./min. The resulting tantalum raffinate contained 0.02 percent $Cb_2O_5$.

The crude columbium raffinate ran from Box II to a tank where it was accumulated and then fed to Box IV along with methyl isobutyl ketone and 1 N $H_2SO_4$ at the following rates:

|  | Ml./min. |
|---|---|
| Methyl isobutyl ketone (Stage 1) | 1200 |
| Crude columbium raffinate (Stage 8) | 2000 |
| 1 N $H_2SO_4$ (Stage 12) | 200 |

The raffinate from Box IV contained less than 0.03 percent $Ta_2O_5$.

The extract from Box IV was fed back to the tank which contains organic scrub for Box II.

SUPPLEMENTAL EXTRACTION OF TANTALUM FROM ORGANIC EXTRACT RESULTING FROM SECOND STEP

A similar modification of the method of this invention may be used to produce a supplemental extraction of the tantalum value from the organic extract which results from the second step of the method.

As explained above, if the acidity of the extraction system of the second step of the method of this invention is high enough, the aqueous raffinate will contain substantially only columbium value and the organic extract will contain a small proportion of fluocolumbic acid in addition to the tantalum value.

In this situation, the columbium value recovered from the second step of the method of this invention is of very high purity. If the organic extract from the second step is introduced into another or supplemental extraction system generally similar to the extraction system of the second step, the small proportion of fluocolumbic acid contained in the organic extract will be substantially all extracted to the aqueous raffinate and the resulting tantalum in the organic extract from this supplemental step will also be of very high purity.

The supplemental extraction step in this modification of the method of this invention may be thought of as the fourth step of the method, although it is of course only the third double solvent extraction system employed in the method. The conditions of operation of the fourth box should be substantially the same as those of the second step of the three-step method. To separate out the tantalum value, the organic extract from the fourth box is introduced into a box similar to the last box of the three-step system previously described.

*Example 16*

In this example, the final columbium value is contained in the aqueous raffinate from Box II, and the final tantalum value is contained in the aqueous raffinate from Box III. The final columbium solution contains 0.10% $Ta_2O_5$, and the final tantalum solution contains 0.01% $Cb_2O_5$.

An organic feed solution of the following analysis is introduced into Box I:

[250 grams oxide per liter]

|  | Percent |
|---|---|
| $Ta_2O_5$ | 55 |
| $Cb_2O_5$ | 44 |
| Fe | 0.54 |
| $TiO_2$ | 0.1 |
| Others | Less than 1 |

The feed rates employed in the first step of the method of the invention in this example are:

|  | Ml./min. |
|---|---|
| Methyl isobutyl ketone (Stage 1) | 400 |
| Organic feed (Stage 8) | 2000 |
| 6 M $H_2SO_4$ (Stage 12) | 400 |

Analysis of samples of the extract taken at random from the output end of Box I shows:

| Fe | Less than 0.005%. |
|---|---|
| $TiO_2$ | Do. |
| Ni | Do. |
| $ZrO_2$ | Less than 0.05%. |
| Others | Do. |

The extract from Box I is fed continuously to Stage 9 of Box II at approximately 2300 ml./min., with methyl isobutyl ketone and 1 N $H_2SO_4$ being fed into Box II as follows:

|  | Ml./min. |
|---|---|
| Methyl isobutyl ketone (Stage 1) | 1200 |
| 1 N $H_2SO_4$ (Stage 12) | 1000 |

Analysis of samples of the tantalum extract and columbium raffinate taken at random from the organic and aqueous outputs, respectively, of Box II shows:

|  | Tantalum Extract, Percent | Columbium Raffinate, Percent |
|---|---|---|
| $Ta_2O_5$ | 95.2 | 0.10 |
| $Cb_2O_5$ | 4.8 | 99.9 |

The organic extract from Box II is fed continuously to Stage 5 of Box IV at approximately 3000 ml./min., with methyl isobutyl ketone and 1 N $H_2SO_4$ being fed into Box IV as follows:

|  | Ml./min. |
|---|---|
| Methyl isobutyl ketone (Stage 1) | 600 |
| 1 N $H_2SO_4$ (Stage 12) | 600 |

Analysis of samples of the tantalum extract taken at random from Box IV shows 99.9+% $Ta_2O_5$ and 0.01% of $Cb_2O_5$.

The extract from Box IV is fed continuously to Stage 1 of Box III at approximately 3500 ml./min. The feed rate of the water to Stage 12 of Box III is 3500 ml./min.

The raffinate from Box IV may be recycled as a portion of the 1 N $H_2SO_4$ aqueous scrub solution to be introduced into Box II.

The above detailed description is given for clearness of understanding only. No unnecessary limitations are to be understood therefrom, as modifications will be obvious to persons skilled in the art.

I claim:
1. A method for producing separate solutions of columbium and tantalum values from a starting mixture containing said values and also containing as impurities a compound of a metal selected from the group consisting of titanium, iron, silicon, aluminum, zirconium, tin, manganese, calcium, sodium, tungsten, molybdenum, potassium, magnesium, barium and strontium, which metals form a compound selected from the group consisting of fluorides and fluo-acids which compound is soluble in water and is less soluble than are fluocolumbic and fluotantalic acids in a substantially water-immiscible organic solvent selected from the group consisting of methyl isobutyl ketone, diethyl ketone, cyclohexone, diisobutyl ketone, tributyl phosphate, and mutually soluble mixtures thereof, which comprises: forming from said starting mix- ture a solution of fluocolumbic acid and fluotantalic acid in a solvent selected from the group consisting of water and said organic solvents, said solution when formed in an organic solvent having a hydrogen ion concentration of at least about 8 normal and when an aqueous solution of at least about 13 normal, said solution also containing a compound selected from the group consisting of a fluoride and a fluo-acid of one of said metal impurities present in said starting material; introducing said solution into an intermediate stage of a multi-stage countercurrent extraction system employing two solvents, one solvent being selected from said group of substantially water-immiscible organic solvents and the other being an acidic aqueous solvent having a hydrogen ion concentration of about 10 normal to about 18 normal, to preferentially extract fluorides and fluo-acids of said metal impurities to the aqueous phase of said extraction system and fluocolumbic and fluotantalic acids to the organic phase of said extraction system; introducing said organic phase containing said fluocolumbic and fluotantalic acids into an intermediate stage of a second multi-stage countercurrent extraction system employing two solvents, one solvent being selected from said group of substantially water-immiscible organic solvents and the other being an acidic aqueous solvent having a hydrogen ion concentration of about 0.5 normal to about 4 normal, whereby the mixing of said aqueous solvent and said feed solution produces a hydrogen ion concentration at which at least part of the fluocolumbic acid of said organic phase is converted to a more water soluble fluorine compound of columbium, to preferentially extract said fluorine compound of columbium to the aqueous phase of said second extraction system and fluotantalic acid to the organic phase of said second extraction system, the organic solvents employed in said two extraction systems being mutually soluble; and bringing said last mentioned organic phase containing fluotantalic acid into contact with a scrub liquid selected from the group consisting of water and a dilute aqueous solution of a mineral acid selected from the group consisting of sulfuric acid, nitric acid, hydrofluoric acid, hydrochloric acid, perchloric acid, phosphoric acid and compatible mixtures of said acids to preferentially extract said fluotantalic acid to the resulting aqueous phase.

2. The method of claim 1 in which said acidic aqueous solvent in said first mentioned multi-stage countercurrent double solvent extraction system is an aqueous solution of a mineral acid selected from the group consisting of sulfuric acid, nitric acid, hydrofluoric acid, hydrochloric acid, perchloric acid, phosphoric acid and compatible mixtures of said acids, and said acidic aqueous solvent in said second multi-stage countercurrent double solvent extraction system is also an aqueous solution of an acid selected from said group of mineral acids.

3. The method of claim 2 in which the organic solvent in said first mentioned multi-stage countercurrent double solvent extraction system is methyl isobutyl ketone.

4. The method of claim 3 in which the acidic aqueous solvent in said first mentioned multi-stage countercurrent double solvent extraction system is an aqueous solution of sulfuric acid.

5. The method of claim 1 in which said solution of fluocolumbic acid and fluotantalic acid formed from said starting mixture is in a solvent selected from said group of organic solvents, and has a hydrogen ion concentration of at least about 8 normal.

6. A method for producing separate solutions of columbium and tantalum values from a starting mixture containing said values and also containing as impurities a compound of a metal selected from the group consisting of titanium, iron, silicon, aluminum, zirconium, tin, manganese, calcium, sodium, tungsten, molybdenum, potassium, magnesium, barium and strontium, which metals form a compound selected from the group consisting of fluorides and fluo-acids which compound is soluble in water and is less soluble than are fluocolumbic and fluotantalic acids in a substantially water-immiscible organic solvent selected from the group consisting of methyl isobutyl ketone, diethyl ketone, cyclohexone, diisobutyl ketone, tributyl phosphate, and mutually soluble mixtures thereof which comprises: forming from said starting mixture an aqueous solution of fluocolumbic acid and fluotantalic acid, said solution having a hydrogen ion concentration of at least about 13 normal, said solution also containing a compound selected from the group consisting of a fluoride and a fluo-acid of one of said metal impurities present in said starting material; introducing said aqueous solution into an intermediate stage of a multi-stage countercurrent extraction system employing two solvents, one solvent being selected from said group of substantially water-immiscible organic solvents and the other being an acidic aqueous solvent having a hydrogen ion concentration of about 10 normal to about 18 normal, to preferentially extract fluorides and fluoacids of said metal impurities to the aqueous phase of said extraction system and fluocolumbic and fluotantalic acids to the organic phase of said extraction system; introducing said organic phase containing said fluocolumbic and fluotantalic acids into an intermediate stage of a second multi-stage countercurrent extraction system employing two solvents, one solvent being selected from said group of substantially water-immiscible organic solvents and the other being an acidic aqueous solvent having a hydrogen ion concentration of about 0.5 normal to about 4 normal, whereby the mixing of said aqueous solvent and said feed solution produces a hydrogen ion concentration at which at least part of the fluocolumbic acid of said organic phase is converted to a more water soluble fluorine compound of columbium, to preferentially extract said fluorine compound of columbium to the aqueous phase of said second extraction system and fluotantalic acid to the organic phase of said second extraction system, the organic solvents employed in said two extraction systems being mutually soluble; and bringing said last mentioned organic phase containing fluotantalic acid into contact with a scrub liquid selected from the group consisting of water and a dilute aqueous solution of a mineral acid selected from the group consisting of sulfuric acid, nitric acid, hydrofluoric acid, hydrochloric acid, perchloric acid, phosphoric acid and compatible mixtures of said acids to preferentially extract said fluotantalic acid to the resulting aqueous phase.

7. The method of claim 6 in which the organic solvent in said first mentioned multi-stage countercurrent double solvent extraction system is methyl isobutyl ketone.

8. The method of claim 7 in which the acidic aqueous solvent in said first mentioned multi-stage countercurrent double solvent extraction system is an aqueous solution of sulfuric acid.

9. The method of claim 6 in which said acidic aqueous solvent in said first mentioned multi-stage countercurrent double solvent extraction system is an aqueous solution of a mineral acid selected from the group consisting of sulfuric acid, nitric acid, hydrofluoric acid, hydrochloric acid, perchloric acid, phosphoric acid and compatible mixtures of said acids, and said acidic aqueous solution in said second multi-stage countercurrent double solvent extraction system is a solution of an acid selected from said group of mineral acids.

10. The method of claim 6 in which said aqueous solution of fluocolumbic acid and fluotantalic acid formed from said starting mixture has a hydrogen ion concentration of about 26 normal; said acidic aqueous solution in said first mentioned multi-stage countercurrent double solvent extraction system is a solution, having a hydrogen ion concentration of about 12 normal, of a mineral acid selected from the group consisting of sulfuric acid, nitric acid, hydrofluoric acid, hydrochloric acid, perchloric acid, phosphoric acid and compatible mixtures of said acids; and said acidic aqueous solution in said second multi-stage countercurrent double solvent extraction system is a solution of an acid selected from said group of mineral acids, having a hydrogen ion concentration of about 1 normal.

11. A method for producing separate solutions of columbium and tantalum values from a starting mixture containing said values and also containing as impurities a compound of a metal selected from the group consisting of titanium, iron, silicon, aluminum, zirconium, tin manganese, calcium, sodium, tungsten, molybdenum, potassium, magnesium, barium and strontium, which metals form a compound selected from the group consisting of fluorides and fluo-acids which compound is soluble in water and is less soluble in methyl isobutyl ketone than are fluocolumbic and fluotantalic acids, which comprises: forming from said starting mixture a solution of fluocolumbic acid and fluotantalic acid in methyl isobutyl ketone, said solution having a hydrogen concentration of at least about 8 normal, said solution also containing a compound selected from the group consisting of a fluoride and fluo-acid of one of said metal impurities present in said starting material; introducing said solution into an intermediate stage of a multi-stage countercurrent extraction system employing two solvents, one solvent being methyl isobutyl ketone and the other being an acidic aqueous solvent having a hydrogen ion concentration of about 10 normal to about 18 normal, to preferentially extract fluorides and fluo-acids of said metal impurities to the aqueous phase and fluocolumbic and fluotantalic acids to the organic phase of said extraction system; introducing said organic phase containing said fluocolumbic and fluotantalic acids into an intermediate stage of a second multi-stage countercurrent extraction system employing two solvents, one solvent being methyl isobutyl ketone and the other being an acidic aqueous solvent having a hydrogen ion concentration of about 0.5 normal to about 4 normal, whereby the mixing of said aqueous solvent and said feed solution produces a hydrogen ion concentration at which at least a part of the fluocolumbic acid and of said organic phase is converted to a more water soluble fluorine compound of columbium, to preferentially extract said fluorine compound of columbium to the aqueous phase of said second extraction system and fluotantalic acid to the organic phase of said second extraction system; and bringing said last mentioned organic phase containing fluotantalic acid into contact with a scrub liquid selected from the group consisting of water and a dilute aqueous solution of a mineral acid selected from the group consisting of sulfuric acid, nitric acid, hydrofluoric acid, hydrochloric acid, perchloric acid, phosphoric acid and compatible mixtures of said acids to preferentially extract said fluotantalic acid to the resulting aqueous phase.

12. The method of claim 11 in which said acidic aqueous solvent in said first mentioned multi-stage countercurrent double solvent extraction system is a solution of a mineral acid selected from the group consisting of sulfuric acid, nitric acid, hydrofluoric acid, hydrochloric acid, perchloric acid, phosphoric acid and compatible mixtures of said acids and said acidic aqueous solution in said second multi-stage countercurrent double solvent extraction system is a solution of an acid selected from said group of mineral acids.

13. The method of claim 11 in which said acidic aqueous solvents in both said multi-stage countercurrent double solvent extraction systems are solutions of sulfuric acid.

References Cited in the file of this patent

UNITED STATES PATENTS

| 2,950,966 | Foos | Aug. 30, 1960 |
| 2,962,372 | Foos et al. | Nov. 29, 1960 |

OTHER REFERENCES

Wilhelm et al.: "U.S. Atomic Energy Commission Report, ISC–458," declassified September 8, 1955, 39 pages. Copy in Scientific Library. Available from Office of Technical Services, Department of Commerce (30 cents).

Stevenson et al.: "Separation of Ta and Nb by Solvent Extraction," Analytical Chemistry, vol. 25, No. 10, October 1953. (Copy in Sci. Lib.) Photocopy 23–23, pages 1517–19.

Foos et al.: U.S. Atom. Energy Comm. Report ISC–694, 71 pages, July 1954, U.S.P.O. Sci. Library. Available from Office of Tech. Services, Dept. of Comm., Washington 25, D.C. (45 cents).

Pierret et al.: U.S. Atom. Energy Comm. Report ISC–796, 25 pages, August 1956, U.S.P.O. Sci. Library. Available from Office of Tech. Services as above (25 cents).

Koerner et al.: U.S. AEC Report, ISC–802, 63 pages, December 1956, U.S.P.O. Sci. Lib. Available from Office of Tech. Services as above (40 cents).